(12) United States Patent
Weksler et al.

(10) Patent No.: US 8,291,042 B2
(45) Date of Patent: Oct. 16, 2012

(54) ON-DEMAND GROUPWARE COMPUTING

(75) Inventors: Arnold S. Weksler, Raleigh, NC (US); Scott E. Kelso, Durham, NC (US); John C. Mese, Cary, NC (US); Nathan J. Peterson, Raleigh, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 820 days.

(21) Appl. No.: 11/461,422

(22) Filed: Jul. 31, 2006

(65) Prior Publication Data

US 2008/0028321 A1      Jan. 31, 2008

(51) Int. Cl.
*G06F 15/16* (2006.01)
*G06F 3/00* (2006.01)

(52) U.S. Cl. ......................... 709/218; 715/749

(58) Field of Classification Search .................. 709/218; 715/748

See application file for complete search history.

(56) References Cited

U.S. PATENT DOCUMENTS

| | | | |
|---|---|---|---|
| 5,025,369 A * | 6/1991 | Schwartz | 718/102 |
| 5,801,700 A | 9/1998 | Ferguson | |
| 5,999,208 A * | 12/1999 | McNerney et al. | 348/14.08 |
| 7,305,677 B2 * | 12/2007 | Marcey et al. | 719/310 |
| 2003/0093466 A1 | 5/2003 | Jarman et al. | |
| 2003/0132967 A1 | 7/2003 | Gangadharan | |
| 2004/0024890 A1 * | 2/2004 | Baek et al. | 709/229 |
| 2004/0049515 A1 | 3/2004 | Haff et al. | |
| 2004/0070608 A1 | 4/2004 | Saka | |
| 2004/0233216 A1 | 11/2004 | Rekimoto et al. | |
| 2006/0271677 A1 * | 11/2006 | Mercier | 709/224 |
| 2006/0287959 A1 * | 12/2006 | Blecken | 705/59 |
| 2009/0024868 A1 * | 1/2009 | Joshi et al. | 714/4 |

* cited by examiner

*Primary Examiner* — Benjamin R Bruckart
*Assistant Examiner* — Shripal Khajuria
(74) *Attorney, Agent, or Firm* — Ference & Associates LLC

(57) ABSTRACT

The collaborative sharing of resources on demand based on proximity, within a group or network of computers. Broadly contemplated herein the "tiling" of a collection of logically adjacent individual graphical desktops in a virtual desktop. In such a setting, the action of dragging a window or icon off of one desktop and onto another would effectively transfer user interactability, and/or perceived ownership of the object, to the desktop where the window or icon graphically "lands".

20 Claims, 1 Drawing Sheet

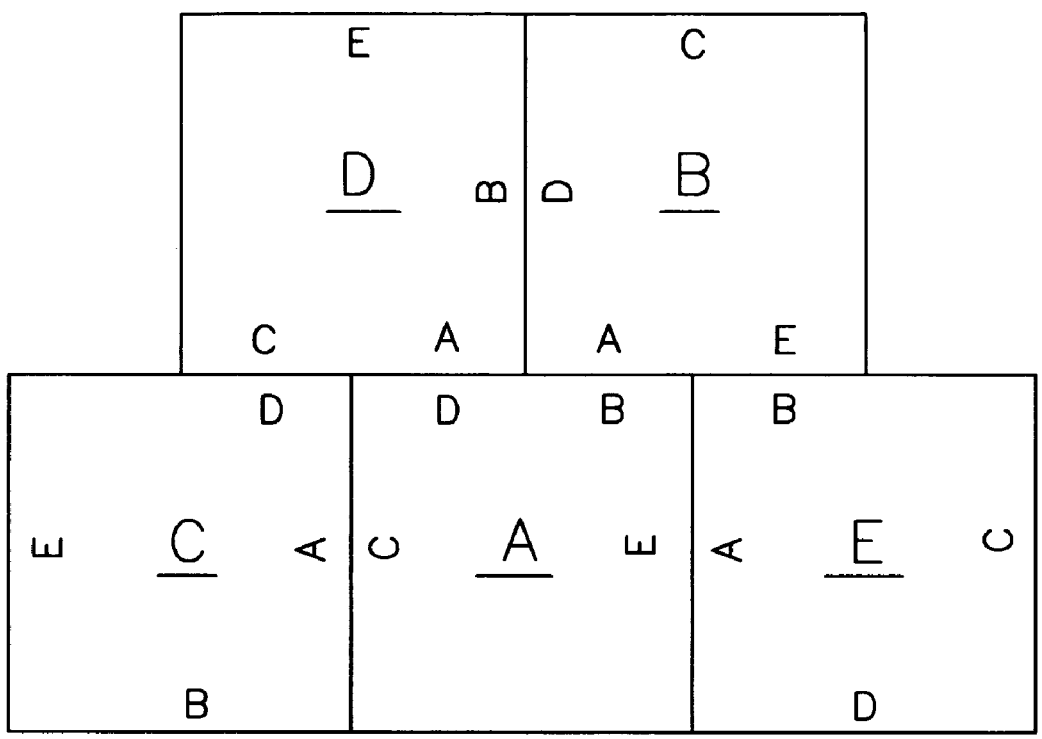

ON-DEMAND GROUPWARE COMPUTING

FIELD OF THE INVENTION

The present invention relates generally to system groups or networks, such as desktop groups, and arrangements for sharing files and the like therewithin.

BACKGROUND OF THE INVENTION

Efforts have long been made in the realm of improving the portability of files between different computer systems. Present efforts have evolved to the point of being able to move files between systems via a graphic interface. For examples, files can easily be moved from one system to the other by way of a "drag and drop" between a remote file server window and a local directory window.

There are limits to these arrangements, however. For instance, conventional systems to date have provided no manner for moving the apparent ownership of running application windows from one user's computer to another. Accordingly, a compelling need has been recognized in connection with affording such a capability.

SUMMARY OF THE INVENTION

Broadly contemplated herein, in accordance with at least one presently preferred embodiment of the present invention, is the collaborative sharing of resources on demand based on proximity. Thus, in the context of systems connected via existing communications and networking technologies, there is broadly contemplated herein the "tiling" of a collection of logically adjacent individual graphical desktops in a virtual desktop.

In such a setting, the action of dragging a window or icon off of one desktop and onto another would effectively transfer user interactability, and/or perceived ownership of the object, to the desktop where the window or icon graphically "lands".

Different scenarios are possible. In an "X windows" scenario, e.g., a window display can be moved to the "target" or receiving system while retaining processing on the "original" or "moved-from" system. On the other hand, in an "MS Windows" scenario, a document and application state could be serialized and then moved as a unit to the "target" system. Generally, local spaces such as virtual conference rooms could be set up with distinct wireless subnets, to permit the automatic generation and creation of "groups".

In summary, one aspect of the invention provides an apparatus comprising: an arrangement for affording, at an originating computer in group of connected computers, a transfer of an object to at least one target computer in the group; an arrangement for effecting a transfer of an object from an originating computer to at least one target computer via a graphical manipulation conducted at the originating computer.

Another aspect of the present invention provides a method comprising the step of transferring, from an originating computer in a group of connected computers, an object to at least one target computer in the group via a graphical manipulation conducted at the originating computer.

Furthermore, an additional aspect of the invention provides a program storage device readable by machine, tangibly embodying a program of instructions executable by the machine to perform method steps, the method comprising the step of transferring, from an originating computer in a group of connected computers, an object to at least one target computer in the group via a graphical manipulation conducted at the originating computer.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 is a schematic illustration of a virtual desktop topology.

DESCRIPTION OF THE PREFERRED EMBODIMENTS

In accordance with a presently preferred embodiment of the present invention, computers are collaboratively connected together to present a single virtual desktop. Preferably, the process of interconnecting involves the exchange of screen resolutions among the computers in question, mutual authentication, and the establishment of a preferred virtual desktop topology. The topology may be determined by the users, or at least initialized to a layout where every user is depicted as being adjacent to all other users.

FIG. 1 schematically depicts a virtual desktop topology in accordance with an embodiment of the present invention. Here, users A, B, C, D and E, at different desktops (indicated by underlined letters), are working together collaboratively. They have chosen to connect their desktops in the manner shown. Thus, D is connected to C, A, B and E, wherein the smaller letters within D's "space" indicate connections to C, A, B, and E respectively. A similar configuration holds true for the other spaces B, C, A and E. It should be understood that desktops as depicted in the virtual topology need not necessarily be shown as physically adjacent in order to transfer files or information from one desktop to another. Thus, e.g., while desktops C and B are not shown as being physically adjacent, they are still functionally interconnected with one another via the smaller letters "B" and "C", respectively.

By way of an illustrative yet non-restrictive working example, assume that user A is working on a document and then wishes to pass it along to user D for editing. This can be accomplished by dragging the window from his desktop off the upper left edge, into the larger space labelled "D". Within the virtual desktop depicted, the window may appear to "slide" off the edge of user A's desktop and onto user D's. The transfer of the document need not necessarily be immediate or automatic; for instance, user D may choose to virus-scan or otherwise inspect the incoming data before accepting the document on his/her desktop.

In terms of what is received at user D's desktop, in accordance with one embodiment (the "MS Windows" scenario), the document and application's state is serialized and transferred to D's system, where processing restarts locally. In accordance with another embodiment (the "X windows" scenario), the display window can appear on D's desktop while processing still continues at user A's desktop (though this will not be visible to user A; in other words, the processing of the display window will remain on system A while it will only be visually available on system D). Similar transfers can be made concurrently between any two partners in the session.

Preferably, each desktop will have a virtual unified desktop (as depicted in FIG. 1) displayed for each user's benefit, as this helps help all users "see" all desktops at once, even though each will only control his/her own desktop. The image as shown (or other analogous images) can of course be scaled to fit each user's display. Thus, in a preferred embodiment of the present invention, each user's screen will have a miniature "map" of the workgroup's tiled virtual desktop, and windows or iconified representations of windows can be dragged or drop to different locations within the "map".

By way of an alternative, a transfer of the type described further above could be accomplished by selecting "user D" from a menu (e.g., drop-down menu) or other display of users to which user A is linked. For instance, a "target" user in the workgroup could be selected from a right-click context menu, or a window menu (e.g., represented by an icon in the upper left corner of the window frame).

By way of yet another alternative, a schematic depiction of desktop topology (as in FIG. 1) could be dispensed with in favor of simply permitting a user to drag a window off the screen edge in a given direction (e.g., left, right, "up" [corresponding perhaps to "forward"] and "down" [corresponding perhaps to "behind"]), and thus on to the virtually—or even physically—adjacent screen of another user in the workgroup. In other words, a basic topology such as that shown in FIG. 1 could be understood by all users, and even marked on or about the entirety of a user's screen, wherein windows are dragged not within a topological "map" on-screen, but off in a given direction "off-screen". The dragging of a window "off-screen" in a given direction could even be representative of an actual corresponding physical direction in which another desktop lies (e.g., dragging off to the left will "send" a document or other data or information to a desktop that literally is to the left).

In any of the above embodiments, it may be helpful to color-code the members of the workgroup. For example, if the implemented gesture (i.e., visual representation) is dragging off the screen edge, then the edges of the screen could be colored differently to make evident which user in the workgroup is adjacent to each portion of the screen edge. It may also be helpful to assign distinct sounds to each user in the workgroup, such that an arriving window and application would "announce" itself as being from a particular user.

Generally, the underlying mechanism for capturing any window transfer gesture could be implemented using a modification to the video driver, a service, the operating system, or the window manager. Other analogously functioning mechanisms are of course conceivable.

By way of a further refinement, once a document has been handed off from one user in a workgroup to another, the problem arises of what to do when the second user chooses to save the document. Possible answers include routing the save action back to the originating system through the channel by which the document was transferred, tagging the document with a network address and saving back to a server directly from the second user's system, or tagging it with a network address and saving it locally on the second user's system, to be synchronized with the server or the first user's system at a later time.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:
an arrangement for affording, at an originating computer in a group of connected computers, a transfer of runtime information in memory comprising a file and an application state of an application utilized to process the file to at least one target computer in the group, the application state including an application identifier, a file identifier of the file being accessed by the application, and user preferences related to the application; and
an arrangement for effecting a transfer of the runtime information in memory, serialized into a sequence of bits and moved as a unit, from the originating computer to the at least one target computer via a graphical manipulation conducted at the originating computer;
wherein said arrangement for affording a transfer acts to transfer runtime information in memory such that processing of the file restarts locally at the at least one target computer.

2. The apparatus according to claim 1, wherein said transfer further comprises moving apparent ownership of one or more running application windows from the originating computer to the at least one target computer.

3. The apparatus according to claim 1, wherein said arrangement for effecting a transfer comprises a visual depiction of group topology provided at the originating computer.

4. The apparatus according to claim 3, wherein said visual depiction comprises a map indicating functional interconnections between computers in the group.

5. The apparatus according to claim 3, wherein said arrangement for effecting a transfer acts to accommodate a drag and drop of a graphical representation of a file within said visual depiction of group topology.

6. The apparatus according to claim 1, wherein said arrangement for effecting a transfer comprises a menu for choosing a target computer.

7. The apparatus according to claim 1, wherein said arrangement for effecting a transfer acts to effect a functional interconnection with a target computer via accommodating a drag and drop of a graphical representation of a file in a predetermined direction off-screen.

8. The apparatus according to claim 7, wherein said arrangement for effecting a transfer acts to provide labeling corresponding to at least one target computer.

9. The apparatus according to claim 1, wherein said visual depiction of group topology includes color-coding to represent at least one target computer.

10. A method comprising the step of transferring, from an originating computer in a group of connected computers, runtime information in memory comprising a file and an application state of an application utilized to process the file, serialized into a sequence of bits and moved as a unit, to at least one target computer in the group via a graphical manipulation conducted at the originating computer, the application state including an application identifier, a file identifier of the file being accessed by the application, and user preferences related to the application;

wherein said transferring acts to transfer runtime information in memory such that processing of the file restarts locally at the at least one target computer.

11. The method according to claim 10, wherein said transferring further comprises moving apparent ownership of one or more running application windows from the originating computer to the at least one target computer.

12. The method according to claim 10, wherein said transferring step comprises employing a visual depiction of group topology provided at the originating computer.

13. The method according to claim 12, wherein the visual depiction comprises a map indicating functional interconnections between computers in the group.

14. The method according to claim 12, wherein said transferring step comprises accommodating a drag and drop of a graphical representation of a file within the visual depiction of group topology.

15. The method according to claim 10, wherein said transferring step comprises employing a menu for choosing a target computer.

16. The method according to claim 10, wherein said transferring step comprises effecting transferring a file and an application state of the file to a target computer via accommodating a drag and drop of a graphical representation of a file in a predetermined direction off-screen.

17. The method according to claim 10, wherein the visual depiction of group topology includes color-coding to represent at least one target computer.

18. A program storage device readable by machine, tangibly embodying a program of instructions executable by the machine to perform one or more actions, said one or more actions comprising transferring, from an originating computer in a group of connected computers, runtime information in memory comprising a file and an application state of an application utilized to process the file, serialized into a sequence of bits and moved as a unit, to at least one target computer in the group via a graphical manipulation conducted at the originating computer, the application state including an application identifier, a file identifier of the file being accessed by the application, and user preferences related to the application;
    wherein said transferring acts to transfer runtime information in memory such that processing of the file restarts locally at the at least one target computer.

19. The program storage device according to claim 18, wherein the file comprises a document.

20. The program storage device according to claim 18, wherein said transferring further comprises transferring said file and said application state such that interactability and/or perceived ownership of said file is effectively transferred to said target computer; and
    wherein said one or more actions further comprise, in response to a save action at said target computer, synchronizing said file and said originating computer at a later time.

\* \* \* \* \*